Patented Sept. 20, 1932

1,878,249

UNITED STATES PATENT OFFICE

WILLIAM HENRY MOSS, OF CUMBERLAND, MARYLAND, ASSIGNOR TO CELANESE CORPORATION OF AMERICA, OF NEW YORK, N. Y., A CORPORATION OF DELAWARE

SYNTHETIC RESIN AND METHOD OF MAKING THE SAME

No Drawing. Application filed October 21, 1927. Serial No. 227,870.

This invention relates to a new synthetic resin of the acetone-phenol type and method of making the same.

An object of my invention is to produce a synthetic resin of the acetone-phenol type which is of general use but which is particularly useful as an ingredient in varnishes or lacquers because of its water-resistant qualities.

A further object of my invention is to produce a synthetic resin from acetone and phenol in the presence of suitable catalysts. Other objects of my invention will appear from the following detailed description.

It is a well known fact that when acetone is heated with an excess of phenol in the presence of a strong acid catalyst, there is formed acetone-phenol, the true chemical name of which is diphenylol propane or dioxy diphenyl dimethyl methane. This product is a definite chemical compound, occurring as white crystals, and having a melting point of 153° to 154° C. The reaction that takes place is represented thus:

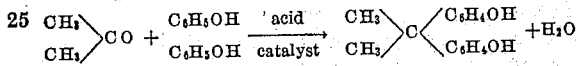

It will be seen that two molecules of phenol combine with one molecule of acetone to form the diphenylol propane.

I have now found that when diphenylol propane is heated with acetone in the presence of a strong acid, they will condense in equi-molecular proportions to form a resin. I have further found that it is not necessary to first make the diphenylol propane, isolate it, and then condense the same with further quantities of acetone, but that if acetone and phenol in equi-molecular proportions are heated together in the presence of a strong acid, there occurs a substantially quantitative conversion of these reactants into an acetone-phenol resin (diphenylol-propane-acetone resin) similar to that prepared from diphenylol propane and acetone.

The acetone-phenol (diphenylol-propane-acetone resin) resin formed by either of the foregoing methods, is then freed from the acid catalyst by washing, whereupon it is dried by distillation either at ordinary pressure or under vacuum. A clear brown resin of the fusible and non-reactive type, and soluble in benzene, alcohol, and acetone is produced. This resin has a melting point of about 50° to 60° C. and may be maintained at a temperature above its melting point for an indefinite time without any indications of conversion to an insoluble or infusible product as often occurs with resins made from phenol or diphenylol propane and formaldehyde.

The resin produced in accordance with my invention is highly water-resistant. Lacquer films prepared from solutions of the resin in any of the above named solvents dry much more rapidly than films containing the common type of synthetic resin, this new resin being comparable with natural resin in this respect.

The new resin may be used in lacquers containing cellulose derivatives such as cellulose acetate and cellulose nitrate, since it is soluble in all the common solvents for these substances and is miscible and compatible with them in such solvents. Films produced from lacquers containing this resin and organic or inorganic derivatives of cellulose are clear, hard, strongly adherent to metallic or other hard surfaces and are particularly water-resistant. The lacquer containing this resin and organic derivatives of cellulose may contain the common softeners or plasticizers, such as diethyl phthalate, tricresyl phosphate, etc. and also such suitable fillers, pigments or dyes as are commonly used in coating compositions.

To further describe my invention, the following specific examples of carrying out the same are given:

Example 1

| The following ingredients | Kg. |
|---|---|
| Diphenylol propane (acetone phenol) | 228 |
| Acetone | 58 |
| Hydrochloric acid (specific gravity 1.19) | 22.8 | are heated under reflux, preferably but not necessarily with stirring, for several hours, i. e., from 16 to 24 hours. A dark red resin is formed. It is separated from the small amount of aqueous liquid present, washed with water, and distilled under vacuum or at ordinary pressures until a resin melting at 50° to 60° is obtained.

*Example 2*

The following are heated under reflux until a resin similar to that above described is obtained:

| | Kg. |
|---|---|
| Phenol | 188 |
| Acetone | 116 |
| Hydrochloric acid | 18.8 |

*Example 3*

| | Kg. |
|---|---|
| Phenol | 188 |
| Acetone | 58 |
| Hydrochloric acid | 18.8 | are heated under reflux until a sample on cooling largely crystallizes out in red crystals which are largely diphenylol propane. To this are then added 58 kilos of acetone, and the heating continued as before until a resin as above described is formed.

The foregoing is given merely by way of illustration. Many variations may be made therein without departing from the spirit of this invention. Thus the acetone in the above examples may be replaced in whole or in part by other ketones such as methyl-ethyl ketone, diethyl, ketone, etc.

The resin may be used as the whole or part of the base in lacquers. An example of a typical lacquer in which it is used is made as follows:

| | Kg. |
|---|---|
| Cellulose acetate | 5 |
| Synthetic resin | 5 |
| Triacetin | 2.5 |

The above are dissolved in a solvent consisting of

| | Kg. |
|---|---|
| Acetone | 50 |
| Benzene | 28 |
| Alcohol | 22 |
| Ethyl lactate | 20 |

Obviously the cellulose acetate may be replaced in whole or in part by other derivatives of cellulose, such as cellulose nitrate or organic derivatives of cellulose. Examples of organic derivatives of cellulose are the organic esters of cellulose, such as cellulose formate, cellulose propionate, cellulose butyrate and cellulose ethers, such as methyl cellulose, ethyl cellulose, benzyl cellulose.

This resin may also be used for other purposes than in making lacquers, such as in the plastic art and as a starting material for making other resins.

While I have described my invention in detail it is to be understood that many variations may be made therein without departing from the spirit thereof.

Having described my invention, what I claim and desire to secure by Letters Patent is:

1. A diphenylolpropane-ketone resin being soluble in benzene, acetone and alcohol.

2. A diphenylolpropane-acetone resin being soluble in benzene, acetone and alcohol.

3. A diphenylolpropane-acetone resin, said resin being fusible and soluble in organic solvents.

4. A synthetic diphenylolpropane-ketone resin, said resin being soluble in benzene, acetone and alcohol, fusible, having a melting point of 50° to 60° C. and compatible with cellulose acetate.

5. A synthetic resin comprising a condensation product of diphenylol-propane and a ketone in approximately equi-molecular proportions.

6. A synthetic resin comprising a condensation product of diphenylol-propane and acetone in approximately equi-molecular proportions.

7. Process of producing a synthetic resin comprising reacting a crystallizable condensation product of a ketone and phenol with a ketone in the presence of a condensation-promoting catalyst until condensation takes place.

8. Process of producing a synthetic resin comprising reacting a crystallizable condensation product of a ketone and phenol with a ketone in the presence of an acid catalyst until condensation takes place.

9. Process of producing a synthethic resin comprising reacting a crystallizable condensation product of acetone and phenol with acetone in the presence of a condensation-promoting catalyst until condensation takes place.

10. Process of producing a synethetic resin comprising reacting a crystallizable condensation product of acetone and phenol with acetone in the presence of an acid catalyst until condensation takes place.

11. Process of producing a resin comprising reacting equi-molecular proportions of phenol and a ketone in the presence of a condensation-promoting catalyst.

12. Process of producing a resin comprising reacting equi-molecular proportions of phenol and a ketone in the presence of an acid catalyst.

13. Process of producing a resin comprising reacting equi-molecular proportions of phenol and acetone in the presence of a condensation-promoting catalyst.

14. Process of producing a resin comprising reacting equi-molecular proportions of phenol and acetone in the presence of an acid catalyst.

15. Process of producing a synthetic resin comprising heating a crystallizable condensation product of a ketone and phenol with a ketone in the presence of a condensing catalyst until condensation takes place.

16. Process of producing a synthetic resin comprising heating diphenylol-propane with acetone in the presence of a condensing catalyst until condensation takes place.

17. Process of producing a synthetic resin comprising boiling a crystallizable condensation product of a ketone and phenol with a ketone in the presence of a condensing catalyst until condensation takes place.

18. Process of producing a synthetic resin comprising boiling diphenylol-propane with acetone in the presence of a condensing catalyst until condensation takes place.

In testimony whereof, I have hereunto subscribed my name.

WILLIAM H. MOSS.